Patented Mar. 20, 1923.

1,449,121

UNITED STATES PATENT OFFICE.

RALPH H. McKEE, OF NEW YORK, N. Y.

PROCESS OF PRODUCING CARVACROL AND THYMOL.

No Drawing.     Application filed May 3, 1920.  Serial No. 378,538.

*To all whom it may concern:*

Be it known that I, RALPH H. McKEE, a citizen of the United States, residing at New York, in the county of New York and State of New York, have invented certain new and useful Improvements in Processes of Producing Carvacrol and Thymol, of which the following is a specification.

This invention relates to the production of carvacrol and thymol from what is known as "spruce turpentine," a hydrocarbon oil which separates on cooling, and condensing the vapors from the dry relief and from the wet relief in the manufacture of pulp from spruce and similar woods, such as balsam and fir, by the sulfite process.

The "spruce turpentine" is ordinarily collected in separating funnels containing an acid solution of calcium bisulfite through which the gases and vapors from the digesters pass, the oil collecting on the surface of the acid liquor from which it is drawn off from time to time. The oil, as thus obtained, contains impurities including sulfur dioxid and tarry bodies which it is desirable to remove therefrom. This purification may be advantageously effected by a single or by repeated distillation in the presence of steam, the distillation being preferably continued until about 80 or 90 per cent of the oil is obtained as a distillate. A single distillation ordinarily yields a product sufficiently free from sulfur dioxid and tarry matters for use in the practice of my process.

The distillate is then subjected to treatment to remove water therefrom. This drying operation may be effected by passing the liquid over or through a drying agent, such as calcium chlorid, or by heating it until about 2 per cent of the product has been removed by vaporization.

Carvacrol is produced by treating the purified spruce turpentine with sulfuric acid, producing an alkali metal salt of the sulfuric acid formed, fusing such salt with a caustic alkali and adding an acid to the resulting mass, as described in Letters Patent No. 1,265,800, granted to me, May 14, 1918. I have lately found that in the practice of this process, a small amount, usually about 5 per cent, of thymol is produced. Now, I have discovered that the proportion of thymol produced in the manufacture of carvacrol can be increased by using fuming sulfuric acid (20 per cent oleum) to 15 or even 20 per cent of the product and that although carvacrol and thymol are substances having nearly the same properties, they can be separated without prohibitory trouble or expense.

In the practice of the present process, the purified spruce turpentine is treated with approximately its own volume of fuming sulfuric acid (20 per cent oleum) at a low temperature, that is, below 50° C., and preferably at from 25 to 30° C. If the temperature is permitted to rise above, or at least materially above, 50° C., considerable amounts of undesired by-products, principally disulfonic acids, will be formed.

To the resulting mass, consisting of a mixture of the 1:2:4 and 1:3:4 sulfonic acids, together with excess sulfuric acid, is then added a basic calcium compound, preferably lime or calcium carbonate, until the acids are substantially neutralized or rendered slightly alkaline, and the resulting calcium sulfate separated by filtration. The filtrate, consisting of the calcium salts of the 1:2:4 and 1:3:4 sulfonic acids, is then converted into the corresponding salts of sodium by the addition of a sufficient quantity of a soluble sodium salt, preferably sodium carbonate. The solution is then preferably filtered and the sodium sulfonic acid salts separated by evaporation, fused with a caustic alkali, preferably caustic soda, and the fused mass dissolved in water and neutralized with acid, such as sulfuric acid, yielding a mixture of approximately from 80 to 85 per cent of carvacrol and 15 to 20 per cent of thymol which may be separated from the mass by distillation.

In practice, I prefer to partially evaporate the solution of the calcium salts of the 1:2:4 and 1:3:4 sulfonic acids to permit the crystallization out on cooling of a part of the calcium salt of the 1:2:4 sulfonic acid. The evaporation is so conducted as to permit about two-thirds of the dissolved salts to crystallize out. The crystals are separated by filtration and washed with a small amount of water. The filtrate and wash water contain the calcium salt of the 1:3:4 sulfonic acid together with some of the 1:2:4 sulfonic acid salt. In practice, this liquid ordinarily contains about equal parts by weight of the 1:2:4 and 1:3:4 acid salts. To this liquid is then added a solution of a soluble sodium salt, preferably a solution of soda ash, and after separating by filtration the precipitated calcium carbonate produced, the resulting solution of sodium sulfonic acid salts is evaporated to dryness, fused with a caustic alkali, preferably caustic soda, and the fused mass dissolved in water and neutralized with an acid, such as sulfuric acid, yielding approximately equal parts by weight of carvacrol and thymol, which may be separated from the mass by decantation or steam distillation.

To the carvacrol-thymol mixture produced as first described or in accordance with my preferred procedure, is then added approximately 3 parts by weight of preferably finely ground, well dried, lead acetate and the mixture allowed to stand for several hours, preferably about 24 hours, at room temperature, and the resulting mass broken up and washed with a volatile petroleum hydrocarbon, preferably gasoline. The thymol-lead acetate addition product obtained is insoluble in the gasoline while carvacrol and the carvacrol-lead acetate addition product which is formed with difficulty, are soluble in gasoline and are removed in the washing operation described.

The thymol-lead acetate compound is then distilled with steam, the thymol passing over with the steam and the lead acetate solution evaporated to dryness for reuse. The resulting thymol is preferably further purified by distillation.

The carvacrol containing filtrate is separated from the gasoline by distillation and the carvacrol separated from the remaining portion by distilling with steam, as described in connection with the thymol separation, and the product preferably further purified by distillation. The lead acetate solution resulting from the decomposition of the carvacrol-lead acetate compound by heating in the presence of steam is evaporated to dryness for reuse.

In the use of fuming sulfuric acid in my process, it is not necessary to employ the particular strength of acid herein referred to. It appears from my experiments that the proportion of the thymol derivative varies with the strength of the acid used so that a desired strength of acid may be selected, in accordance with the results desired.

While I have described in detail the preferred practice of my process, it is to be understood that my invention is not restricted to the proportions of materials set forth nor to the details of procedure, that various changes in the details of procedure and proportions of materials may be resorted to and that known chemical equivalents of the materials employed may be used, all without departure from the spirit of my invention or the scope of the subjoined claims.

Having thus described my invention, I claim:

1. A process of producing carvacrol and thymol, comprising reacting upon spruce turpentine with fuming sulfuric acid to produce 1:2:4 and 1:3:4 sulfonic acids, and treating said sulfonic acids to produce carvacrol and thymol.

2. A process of producing carvacrol and thymol, comprising reacting upon spruce turpentine with approximately its own volume of fuming sulfuric acid of approximately 20 per cent oleum to produce 1:2:4 and 1:3:4 sulfonic acids, and treating said sulfonic acids to produce carvacrol and thymol.

3. A process of producing carvacrol and thymol, comprising reacting upon spruce turpentine with approximately its own volume of sulfuric acid of approximately 20 per cent oleum at a temperature below 50° C., to produce 1:2:4 and 1:3:4 sulfonic acids, and treating said sulfonic acids to produce carvacrol and thymol.

In testimony whereof I affix my signature in presence of two witnesses.

RALPH H. McKEE.

Witnesses:
L. V. EATON,
GEORGE BARSKY.